June 16, 1931.  C. A. TRUMP  1,810,631
POULTRY LEG BAND PLACER AND REMOVER
Filed Dec. 30, 1929
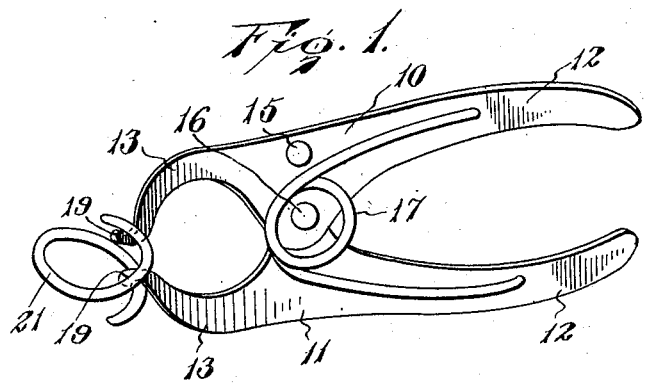
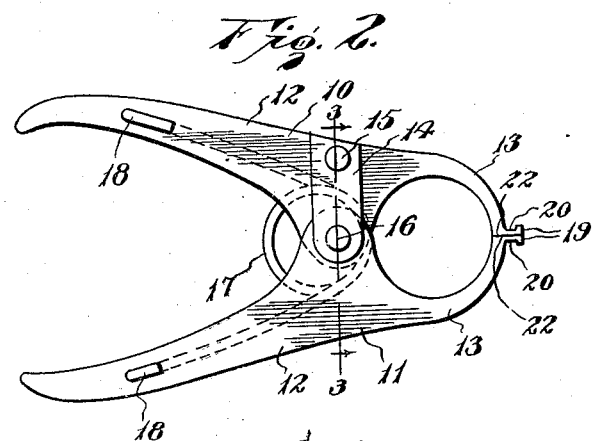
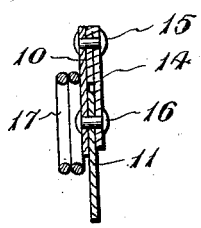
Inventor
C. A. Trump
By Lacey Lacey, Attorneys Patented June 16, 1931

1,810,631

UNITED STATES PATENT OFFICE

CHARLES A. TRUMP, OF DERRY, PENNSYLVANIA

POULTRY LEG-BAND PLACER AND REMOVER

Application filed December 30, 1929. Serial No. 417,509.

This invention relates to poultry raiser's tools and has for an object to provide a tool which will facilitate the application and removal of marker bands or rings.

The marker band used by poultry raisers is usually in the shape of a coil of material such as celluloid and is finished in various colors. Great difficulty is experienced in applying these markers to and removing them from the legs of chickens and it is therefore a further object of this invention to provide a simple tool which will open the coiled marker ring and permit of the chicken's leg being easily slipped from between the jaws of the tool into the ring to quickly apply the ring.

With the above and other objects in view the invention consists in certain novel details of construction and combinations of parts hereinafter fully described, it being understood that various modifications may be resorted to within the scope of the appended claims without departing from the spirit or sacrificing any of the objects of the invention.

In the accompanying drawings forming part of this specification,

Figure 1 is a perspective view showing the tool in position to open the marker ring, Figure 2 is a side elevation of the tool, and Figure 3 is a transverse sectional view taken on the line 3—3 of Figure 2.

Referring now to the drawings in which like characters of reference designate similar parts the tool is shown to be constructed of two parts 10 and 11 each of which may be made of one piece of sheet material and consists of a handle 12 and a jaw 13. A plate 14 is riveted to the side of the member 12 as shown at 15. A pivot pin 16 is passed through the member 11 which is confined between the plate 14 and the member 12 and pivotally connects both of these members together.

A coil spring 17 is disposed on the opposite side of the member 10 over the plate 14, the terminals of this spring being passed along the handles 12 of both members and being terminally bent as shown at 18 to pass through openings in the handles and anchor the spring in place. The spring normally holds the handles spread apart and the jaws closed and is placed under compression when the handles are squeezed together in the palm of the operator's hand so as to again close the jaws when the operator opens his grip.

By referring especially to Figure 2 it will be seen that the jaws 13 are curved in outline so as to form approximately a circle when closed and the purpose of this is that a fowl's leg may be received between the jaws in applying the leg band as will presently be fully described without the jaws touching the fowl's leg. The jaws 13 are directed forwardly from the curved portions to provide prongs 19, these prongs being grooved as shown at 20 on their outer faces to provide seats for the leg marker ring 21 when the prongs are inserted between the free ends of the marker ring to open the ring. The prongs 20 are provided with substantially straight confronting faces 22 which abut each other and limit closing movement of the jaws under the action of the spring 17, these faces being located substantially on the center line of the tool as shown in Figure 2.

In operation, the tool is grasped in the right hand and the handles 12 pressed together thus causing the jaws 13 to open. The open jaws are slipped over the chicken's leg. Then the handles 12 are released by slightly releasing the pressure of the fingers and thumb upon the handle, causing the jaws 13 to close around the chicken's leg under the action of the spring 17. The split marker ring 21 is then placed with its terminals against the prongs 19 and the tool is then pressed against the ring to cause the prongs 19 to enter between the terminals, which will come to rest in the grooves 20 of the prongs as shown in Figure 1. The handles 12 are again pressed together causing the jaws 13 to open and causing the ring 21 which is seated on the prongs to also open. Now the tool is slipped back sufficiently to cause the leg of the fowl to pass out from the circular opening formed by the jaws and through the open terminals of the ring and come to rest against the rear side of the ring. The wrist is then turned to turn the tool through an arc of 90°. This positions the ring to encircle the chicken's leg. The tool is now pulled backwardly to remove the prongs 19 from the open ends of the ring and permit the ring to close about the leg. To remove the marking ring from the chicken's leg the manipulative steps above described are reversed.

Having thus described the invention, I claim:

1. In a tool of the class described, handles pivotally connected together and terminating in jaws having curved inner faces adapted to encircle the leg of the fowl, a spring carried by said handles and normally holding said jaws closed, said jaws terminating in substantially straight prongs adapted to be passed between the terminals of a spiral leg ring marker for prying open the marker, said prongs contacting with each other whereby to limit closing movement of the jaws, said prongs being provided with notches opposite their contacting faces adapted to receive the terminals of a split ring leg marker.

2. A tool for applying a split ring leg marker to fowls comprising handles pivotally connected together, jaws on the handles, said jaws having curved inner faces which cooperate in forming a substantially circular opening between the jaws to receive the leg of the fowl to be marked, prongs on said jaws extending substantially along the center line of the tool and having substantially flat contacting faces adapted to engage with each other whereby to limit closing movement of the jaws, said prongs being adapted to be inserted between the terminals of a split ring leg marker for prying open the marker when the handles are pressed together to open the jaws, there being notches formed in said prongs opposite the contacting faces thereof to receive the terminals of the marker, and a spring carried by said handles and normally holding the handles spread apart to maintain the jaws closed.

3. A poultry raiser's tool comprising handles pivotally connected together, jaws on said handles having curved inner faces coacting in forming a substantially circular opening for receiving the leg of a fowl therebetween, axially disposed straight prongs projecting from the ends of said jaws limiting closing movement of the jaws and adapted to be inserted between the terminals of a split ring leg marker for opening the marker, said prongs having notches on the outer edges for receiving the terminals of the marker, a coil spring on one side of one of the handles terminally connected to said handles and normally holding said jaws closed, and a plate carrying the pivot of the jaws and fixed to one of said handles on the opposite side from said spring.

In testimony whereof I affix my signature.

CHARLES A. TRUMP. [L. S.]